R. HUNTINGTON.
SPHERICAL TRIANGLE CALCULATOR.
APPLICATION FILED DEC. 21, 1918.
1,338,730.
Patented May 4, 1920.
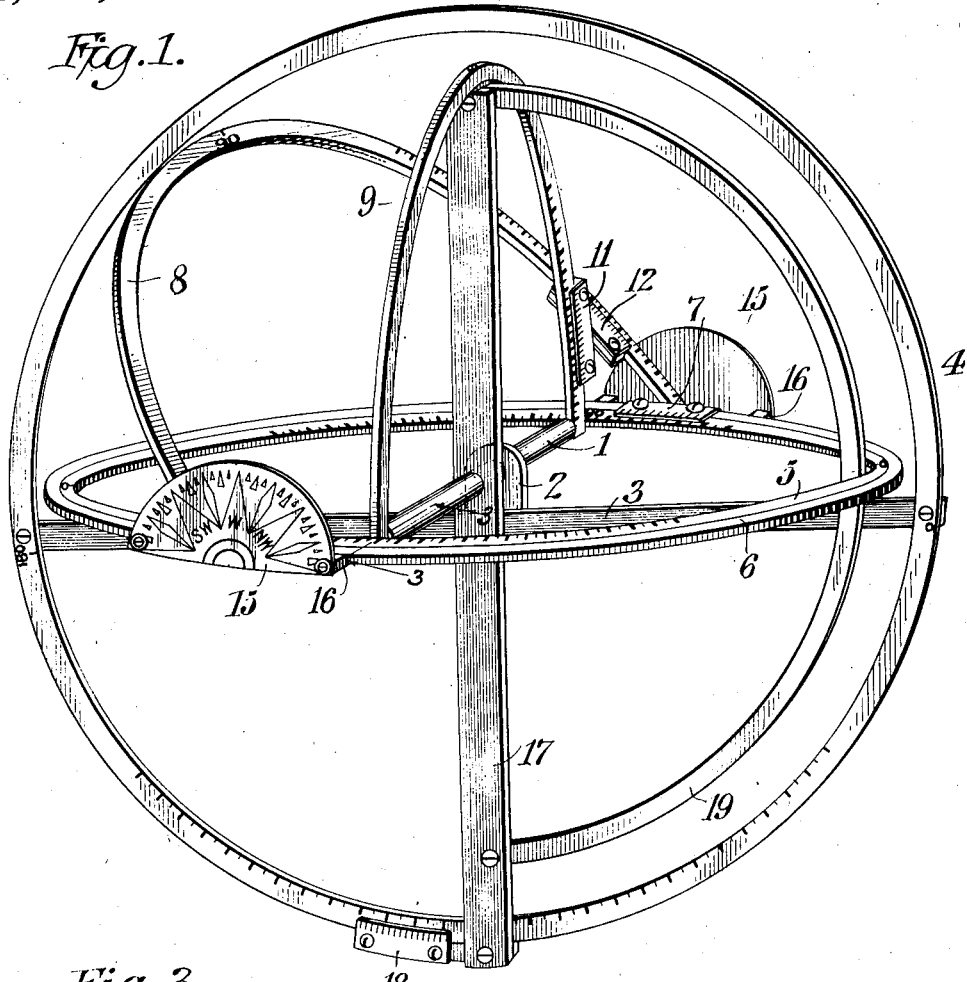
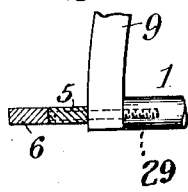
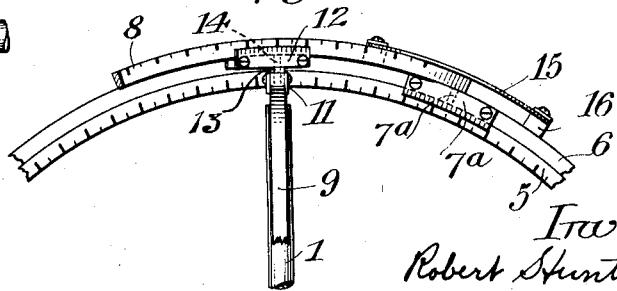
Inventor;
Robert Huntington,
By Sheffield & Betts
His Attorneys.

UNITED STATES PATENT OFFICE.

ROBERT HUNTINGTON, OF ROSEBANK, NEW YORK.

SPHERICAL TRIANGLE CALCULATOR.

1,338,730.  Specification of Letters Patent.  Patented May 4, 1920.

Application filed December 21, 1918. Serial No. 267,745.

*To all whom it may concern:*

Be it known that I, ROBERT HUNTINGTON, a citizen of the United States, and a resident of Rosebank, Staten Island, in the county of Richmond and State of New York, have invented certain new and useful Improvements in Spherical Triangle Calculators, of which the following is a description.

My invention relates to a device of the class of mechanical calculators and has as its principal object the provision of means whereby the solutions of all problems of the character occurring in spherical calculations, including its application to nautical astronomy, may be obtained with a minimum of computation.

A second object of my invention is the production of a device which, when the given ship's latitude, declination of heavenly body to be observed, and hour angle have been set on the device, will enable the operator to read the zenith distance of the said heavenly body and true azimuth thereof. It will be seen that the said quantities to be obtained by the use of my device are those required by the Marcque Saint Hilaire modification of the Sumner method of finding the ship's position.

A further object of my invention is to provide mechanical means whereby the equation for the altitude of a given body may be solved without computation.

Another object of my invention is to provide means whereby the amount of computation necessary in finding the ship's position by the Marcque Saint Hilaire method may be reduced to a minimum.

Further objects will be apparent to those skilled in astronomy or navigation from a study of the following description and claims.

In said drawing accompanying and forming part of this application, I have illustrated the preferred embodiment of my invention.

In said drawing,

Figure 1 is a perspective view of a device embodying my invention;

Fig. 2 is a detail view illustrating more fully several of the verniers and pivots of the device shown in Fig. 1;

Fig. 3 is a detail view partly in section, on the line 3—3 of Fig. 1 and illustrating further details of construction of the device shown in Fig. 1.

In the separate views, the same part is designated by the same reference character.

Referring to the drawing in detail, 1 is an axis which represents the axis of the earth. A nut 2 is fixed to the axis 1, and an arm 3 is fixed rigidly to the nut 1 by soldering, welding, or other suitable process or means. The arm 3 extends at right angles to the axis 1, and is connected rigidly at its outer ends with an equatorial or hour angle circle 4, which is thus in a plane at right angles to said axis, arm 3 being substantially a diameter of the circle 4. Mounted on axis 1 is a latitude circle 5. The plane of the circle 5 is at right angles to that of circle 4, and also is held parallel to the diameter 3. Slidably mounted on the latitude circle 5 is a meridian circle 6. The circle 6 has two verniers, such as 7, thereon 180 degrees apart, which coöperate with a scale on the latitude circle 5 and in the line of the zeros of said verniers are two pivots, such as $7^a$, on which are mounted a circle 8 which is the zenith distance circle. One of the points $7^a$ is assumed as the ship's position in using my calculator in the solution of problems. It is unnecessary, however, that circle 8 extend through the full 360 degrees of arc, and it is made to extend only from one pivot to the other through 180 degrees of arc. Pivotally mounted on the axis 1 is a declination circle 9, also made to extend through 180 degrees of arc.

The details of the connection between axis 1 and circles 5 and 9 are shown in detail in Fig. 3, in which it appears that pins, such as 29, are passed through the circles 5 and 9 into the ends of the axis 1, thus forming pivots for the circle 9. It is, of course, undesirable that circle 5 should turn on axis 1 with respect to the circle 4, and this is prevented by the arm 3, the circle 4 lying outside of circles 5 and 6, as shown in Fig. 1.

The zenith distance circle 8 is mounted so that it moves on a spherical surface immediately inside the equatorial circle 4, while the declination circle 9 moves on a spherical surface immediately inside of the latitude circle 5. There is a vernier carried by the declination circle 9 and this coöperates with a scale on the equatorial circle 4 to indicate the angular distance between the plane of the meridian circle 6, and the declination circle 9. Also there are two connected verniers 11 and 12 sliding one on each of the declination and zenith circles respectively, these two circles being graduated in degrees of arc to coöperate with said verniers. Vernier 11 indicates the angular distance along the declination circles between the equatorial circle 4 and the point of intersection of the declination circle 9 and the zenith distance circle 8. The vernier 12 indicates the angular distance measured on the zenith distance circle between the pivot of the zenith distance circle 8 and the intersection of the plane of the zenith distance circle 8 and the declination circle 9. The equatorial circle 4 is graduated from 0 to 180 degrees, the zero being in a line in or parallel to the plane of ship's meridian circle 6. Latitude circle 5 and declination circle 9 are graduated from zero at the plane of the equatorial circle 4 to 90 degrees at the poles or a line through axis 1. Zenith distance circle 8 is graduated from zero at the pivots 7ᵃ on verniers 7 to 90 degrees at the center.

The details of construction of verniers 11 and 12 are illustrated in detail in Fig. 2, in which 13 is a spacing block intermediate the two verniers and 14 is a pin shown in dotted lines only passing through the vernier and the block. The verniers 11 and 12 are connected by the pin 14, but can swivel thereon. Consequently, the verniers can accommodate themselves to any possible position of the zenith distance and declination circles and do not hinder the movements of these circles.

In order to indicate the true azimuth of a celestial body, I provide compass roses 15—15 whose centers lie in the prolongation of the axis of the zenith distance circle. As shown in Fig. 1, roses 15 are mounted on blocks, such as 16, carried on ship's meridian circle 6, so that zenith distance circle 8 may swing freely beneath said roses. It will be obvious that the azimuth of a body in the plane of circle 8 can be read directly on the roses 15.

In order to determine the position of a body in the heavens, both its true azimuth and zenith distance must be fixed. Consequently, the plane of the declination circle 9 must be adjustable and means provided for indicating the angle between such plane and the plane of the ship's meridian circle. For the latter purpose, I provide an arm 17 in the equatorial plane which is fixed to the declination circle 9 and extends from the declination circle to the equatorial circle 4, intersecting the axis 1. Arm 17 is slidable around circle 4 and a vernier 18 is provided which coöperates with a scale on 4 to indicate the angular position of the declination circle with respect to the plane of 5 and 6. For mechanical reasons, I provide a semi-circle 19, the ends of which are fixed to arm 17 and which slides on arm 3 within circle 5, giving the corresponding hour angle on equatorial circle 4.

It will be understood that circles 4, 5, 8 and 9 are all graduated throughout, although only a small section of each of these scales is shown in the drawing.

As an illustration of the class of problems which may be solved by the use of my invention, I will now describe the method of operation in solving three problems which frequently come up in navigation:

Given ship's latitude (usually found by dead reckoning), hour angle of sun or other heavenly body, and declination thereof, to find zenith distance, true azimuth and calculated altitude as required in Marcque Saint Hilaire's method. Set ship's latitude to latitude on circle 5 by shifting vernier 7 to proper point on 5; set calculated hour angle on circle 4 by vernier 18, set declination on circle 9 by vernier 11. The zenith distance may now be read on circle 8 by vernier 12. The altitude is the complement of the zenith distance. The azimuth is read on one of the roses 15. The difference between the calculated altitude as obtained above and that obtained by observation of the sun, star or other heavenly body, is the error in the position of the ship as assumed in the direction of the plane including the ship and the body, and should be set off on the chart either toward or from the body observed.

To calculate the great circle course and distance, set one vernier 7 carrying a compass rose to the latitude of the point of departure on circle 5; set the difference in the longitude between the points of departure and destination on circle 4 by vernier 18; move vernier 11 on circle 9 to latitude of destination. The distance is then read in angular units on the circle 8 by vernier 12, and the true initial Great-Circle Course is read on the compass rose.

To find the true azimuth, given ship's latitude, declination of star, and hour angle of star. Set declination of sun or star on declination circle 9; set ship's latitude on circle 5; set hour angle on circle 4. The true azimuth is read on rose 15 at ship's position.

The solution of the above problems is given merely by way of example, and it is not to be considered that my device is limited to the solution of said problems only, as all other problems in practical astronomy that are necessary for safe navigation can be solved by it.

Having thus described my invention, I claim:

1. A device of the class described comprising in combination, an equatorial or hour angle circle, an axis fixed with relation to said circle perpendicular to the plane of said circle through the center thereof, a latitude circle fixed with respect to said axis, a meridian circle surrounding said latitude circle and movable thereon, a declination circle pivoted on said axis, a zenith distance circle pivoted on said meridian circle, means for indicating the angular position of the axis of said zenith distance circle on said latitude circle, means for indicating the intersection of said declination with said equatorial circle on the latter, and means for indicating the point of intersection of said declination circle and said zenith distance circle on both said declination and zenith distance circles.

2. A device of the class described comprising in combination, an equatorial or hour angle circle, an axis perpendicular to the plane of said circle and fixed with respect thereto, a latitude circle fixed with respect to said axis, a meridian circle surrounding said latitude circle and movable thereon, a declination circle pivoted on said axis, a zenith distance circle pivoted on said meridian circle, means for indicating the angular position of the axis of said zenith distance circle on said latitude circle, means for indicating the intersection of said declination with said equatorial circle on the latter, means for indicating the point of intersection of said declination circle and said zenith distance circle on both said declination and zenith distance circles, and a compass rose at the pivot points of said zenith distance circle on said latitude circle.

3. A mechanical calculator for navigators and the like, comprising in combination an axis, a latitude circle fixed with respect to said axis, a meridian circle surrounding said latitude circle and movable thereon, a declination circle pivoted on said axis, a zenith distance circle pivoted on said meridian circle and connected indicators on said declination and zenith distance circles.

4. A device of the kind described, comprising in combination, an equatorial or hour angle circle an axis perpendicular to the plane of said circle fixed with respect thereto, a latitude circle fixed with respect to said axis, a meridian circle surrounding said latitude circle and movable thereon, a declination circle pivoted on said axis, a zenith distance circle pivoted on said meridian circle, means for indicating the angular position of said meridian circle on said latitude circle, means for indicating the intersection of said declination with said equatorial circle on the latter, and means for indicating the point of intersection of said declination circle and said zenith distance circle on both said declination and zenith distance circles.

5. A device of the class described comprising in combination an equatorial or hour angle arc, latitude arc whose plane is fixed with relation to the plane of said arc and is perpendicular thereto, a meridian arc slidably mounted on said latitude arc, a declination arc pivoted to turn about points on a line through the poles of said equatorial arc, a zenith distance arc pivoted on said meridian arc, means for indicating the angular position of the axis of said zenith distance arc on said latitude arc, means for indicating the intersection of the plane of said declination arc with the said equatorial arc on the latter, and means for indicating the point of intersection of said declination arc and said zenith distance arc on both said declination and zenith distance arcs.

6. A device of the class described comprising in combination an equatorial or hour angle arc, a latitude arc whose plane is fixed with relation to the plane of said arc and is perpendicular thereto, a meridian arc slidably mounted on said latitude arc, a declination arc pivoted to turn about points on a line through the poles of said equatorial arc, a zenith distance arc pivoted on said meridian arc, means for indicating the angular position of the axis of said zenith distance arc on said latitude arc, means for indicating the intersection of the plane of said declination arc with the said equatorial arc on the latter, means for indicating the point of intersection of said declination arc and said zenith distance arc on both said declination and zenith distance arcs, and an azimuth indicating means on said meridian arc at a pivot of said zenith distance arc.

7. A mechanical calculator for navigators and the like persons, comprising in combination a latitude arc, a meridian arc in juxtaposition to said latitude arc and mounted to move relatively thereto, a declination arc pivoted to turn about points on a line through points on said latitude arc spaced 180° apart, a zenith distance arc pivoted on said meridian arc, and connected indicators on said declination and zenith distance arcs.

8. A device of the kind described, comprising in combination an equatorial arc, a latitude arc in a plane perpendicular to that of said equatorial arc, a meridian arc in juxtaposition to said latitude arc and movable with respect thereto, a declination arc pivoted to said latitude arc at points in the line through the poles of said equatorial arc, a zenith distance arc pivoted on said meridian arc, means for indicating the angular position of said meridian arc on said latitude arc, means for indicating the intersection of said declination arc with said equatorial arc on the latter, and means for indicating the point of intersection of said declination arc and said zenith distance arc on both said declination and zenith distance arcs.

9. A mechanical calculator for navigators and the like persons, comprising in combination a latitude arc, a meridian arc in juxtaposition to said latitude arc and mounted to move relatively thereto, a declination arc pivoted to turn about points on a line through points on said latitude arc spaced 180° apart, a zenith distance arc pivoted on said meridian arc, connected indicators on said declination and zenith distance arcs, and an azimuth indicating means on said meridian arc at a pivot of said zenith distance arc.

10. A device of the kind described comprising in combination an equatorial arc, a latitude arc in a plane perpendicular to that of said equatorial arc, a meridian arc in juxtaposition to said latitude arc and movable with respect thereto, a declination arc pivoted to said latitude arc at points in the line through the poles of said equatorial arc, a zenith distance arc pivoted on said meridian arc, means for indicating the angular position of said meridian arc on said latitude arc, means for indicating the intersection of said declination arc with said equatorial arc on the latter, means for indicating the point of intersection of said declination arc and said zenith distance arc on both said declination and zenith distance arcs, and an azimuth indicating means on said meridian arc at a pivot of said azimuth arc.

ROBERT HUNTINGTON.